(12) United States Patent
Landes (10) Patent No.: US 7,258,650 B2
(45) Date of Patent: Aug. 21, 2007

(54) SYSTEMS AND METHODS FOR CONTROLLING A POWERTRAIN

(75) Inventor: Jim Wilbur Landes, East Peoria, IL (US)

(73) Assignee: Caterpillar Inc., Peoria, IL (US)

(*) Notice: Subject to any disclaimer, the term of this patent is extended or adjusted under 35 U.S.C. 154(b) by 253 days.

(21) Appl. No.: 11/159,312

(22) Filed: Jun. 23, 2005

(65) Prior Publication Data

US 2006/0293149 A1    Dec. 28, 2006

(51) Int. Cl.
*B60W 10/02*    (2006.01)
*B60W 10/06*    (2006.01)

(52) U.S. Cl. ...................................... 477/168; 477/174

(58) Field of Classification Search ................ 477/166, 477/168, 169, 174, 175, 83
See application file for complete search history.

(56) References Cited

U.S. PATENT DOCUMENTS

| | | | |
|---|---|---|---|
| 3,683,721 A | 8/1972 | Uozumi et al. |
| 4,056,991 A | 11/1977 | Sakai et al. |
| 4,095,486 A | 6/1978 | Ohnuma |
| 4,134,313 A | 1/1979 | Ishikawa |
| 4,171,029 A | 10/1979 | Beale |
| 4,246,805 A | 1/1981 | Umezawa |
| 4,291,595 A | 9/1981 | Jelaca |
| 4,367,528 A | 1/1983 | Kawamoto et al. |
| 4,408,462 A | 10/1983 | Sakakibara et al. |
| 4,413,535 A | 11/1983 | Hobbs |
| 4,457,411 A | 7/1984 | Hiramatsu |
| 4,466,311 A | 8/1984 | Hiramatsu |
| 4,468,988 A | 9/1984 | Hiramatsu |
| 4,484,656 A | 11/1984 | Bird |
| 4,513,638 A | 4/1985 | Nishikawa et al. |
| 4,516,671 A | 5/1985 | Nishikawa et al. |
| 4,535,652 A | 8/1985 | Nishikawa et al. |
| 4,565,267 A | 1/1986 | Nishikawa et al. |
| 4,579,208 A | 4/1986 | Nishikawa et al. |
| 4,633,737 A | 1/1987 | Nishikawa et al. |
| 4,663,992 A | 5/1987 | Fujiura et al. |
| 4,688,452 A | 8/1987 | Aoyama et al. |
| 4,697,474 A | 10/1987 | Sumiya et al. |
| 4,909,103 A | 3/1990 | Morimoto |
| 4,936,165 A | 6/1990 | Doyle et al. |
| 4,989,563 A | 2/1991 | Fukutomi et al. |
| 5,010,991 A | 4/1991 | Tsukamoto et al. |
| 5,088,357 A | 2/1992 | Kamada et al. |
| 5,115,698 A | 5/1992 | Leising et al. |
| 5,143,191 A | 9/1992 | Nobumoto et al. |

(Continued)

*Primary Examiner*—Sherry Estremsky
(74) *Attorney, Agent, or Firm*—Finnegan, Henderson, Farabow, Garrett & Dunner (57) ABSTRACT

A system is provided for controlling the operation of powertrain, including an engine and a torque converter having a torque converter clutch. The system may include a torque governor for controlling a torque output of the engine and a speed governor for controlling a rotational speed of the engine. The system may further include a powertrain controller operable to receive a command selecting between first and second modes of operation. If the command indicates the first mode of operation, the powertrain controller may enable the torque governor and control the torque converter clutch to operate in accordance with a first clutch profile. If the command indicates the second mode of operation, the powertrain controller may enable the speed governor and control the torque converter clutch to operate in accordance with a second clutch profile that is different from the first clutch profile.

24 Claims, 3 Drawing Sheets

U.S. PATENT DOCUMENTS

| | | | | |
|---|---|---|---|---|
| 5,211,081 | A | 5/1993 | Bota et al. | |
| 5,295,415 | A | 3/1994 | Abe et al. | |
| 5,305,213 | A | 4/1994 | Boardman et al. | |
| 5,393,279 | A | 2/1995 | Bota et al. | |
| 5,433,676 | A | 7/1995 | Abe et al. | |
| 5,483,446 | A | 1/1996 | Momose et al. | |
| 5,496,227 | A | 3/1996 | Minowa et al. | |
| 5,551,930 | A | 9/1996 | Creger et al. | |
| 5,580,332 | A | 12/1996 | Mitchell et al. | |
| 5,662,551 | A | 9/1997 | Kamada | |
| 5,679,092 | A | 10/1997 | Otsubo et al. | |
| 5,679,099 | A | 10/1997 | Kato et al. | |
| 5,700,219 | A | 12/1997 | Ohkubo | |
| 5,833,564 | A | 11/1998 | Harris | |
| 5,842,534 | A | 12/1998 | Frank | |
| 5,882,279 | A * | 3/1999 | Ueki | 477/168 |
| 5,888,169 | A | 3/1999 | Jang | |
| 5,888,171 | A | 3/1999 | Sasaki et al. | |
| 5,941,796 | A | 8/1999 | Lee | |
| 5,978,729 | A | 11/1999 | Landes et al. | |
| 6,017,290 | A * | 1/2000 | Kinoshita et al. | 477/108 |
| 6,019,702 | A | 2/2000 | Ehrenhardt et al. | |
| 6,183,389 | B1 * | 2/2001 | Tabata | 477/5 |
| 6,371,081 | B1 | 4/2002 | Hawkins et al. | |
| 6,434,466 | B1 | 8/2002 | Robichaux et al. | |
| 6,497,212 | B2 | 12/2002 | Matsumoto et al. | |
| 6,537,177 | B2 | 3/2003 | Degroot et al. | |
| 6,565,483 | B2 * | 5/2003 | Segawa et al. | 477/174 |
| 6,615,797 | B2 | 9/2003 | Richard et al. | |
| 6,709,364 | B2 | 3/2004 | Eguchi et al. | |
| 6,846,269 | B2 * | 1/2005 | Reuschel et al. | 477/110 |
| 2003/0060330 | A1 * | 3/2003 | Sato et al. | 477/174 |
| 2006/0079376 | A1 * | 4/2006 | Sekiya et al. | 477/175 |
| 2006/0094564 | A1 * | 5/2006 | Ilda et al. | 477/62 |

* cited by examiner

SYSTEMS AND METHODS FOR CONTROLLING A POWERTRAIN

TECHNICAL FIELD

The present disclosure relates generally to systems and methods for controlling the operation of a powertrain and, more particularly, for controlling the operation of the powertrain of a self-propelled machine.

BACKGROUND

Vocational vehicles, such as cement trucks, dump trucks, and farm tractors, are difficult to operate. In order to reduce operator fatigue and to allow operation by less experienced operators, it is desirable to equip such vehicles with automatic or partially-automated transmissions. It is also frequently necessary for such vehicles to operate at low vehicle speeds for extended periods. For example, when a cement truck is pouring cement along a curb, or a dump truck is spreading gravel along a roadway, or a farm tractor is planting crops, it is desirable for the vehicle to maintain a constant low speed, e.g., two to twelve miles per hour, regardless of the slope or type of terrain.

However, at such low speeds, the torque converter of the automatic transmission transfers only a fraction of the torque produced by the engine to the drive wheels, thereby reducing fuel efficiency with respect to manual transmission vehicles. Also, the resulting slip produces excess heat in the torque converter. Consequently, operation of such vehicles at low speeds for extended periods may reduce the operational life of the torque converter.

In addition, the engine output at low speeds is conventionally controlled by a torque governor. In order to maintain a constant low speed in a torque governing mode, the operator must alternately increase the throttle input in order to maintain the desired speed up slopes and apply the brakes in order to avoid exceeding the desired speed down slopes. Consequently, the operator must manipulate two inputs in order to govern the vehicle speed, thus increasing operator fatigue and taking the operator's attention away from other important tasks. Further, use of the service brakes to limit vehicle speed down slopes reduces the service life of the brakes.

U.S. Pat. No. 6,371,081 describes an engine controller having both a torque governor and a speed governor that may be simultaneously or selectively operated, based on the operator's manipulation of a torque throttle and a speed throttle. However, because the operator is required to manipulate both the torque throttle and the speed throttle in order to control the vehicle, the system described in the '081 patent increases the operator's work load. Moreover, the '081 patent makes no attempt to optimize control of the vehicle transmission in the torque governing and speed governing modes.

The presently disclosed systems and methods for controlling a powertrain are directed to solving one or more of these shortcomings of the prior art control systems.

SUMMARY

A method is provided for controlling the operation of powertrain. The powertrain may include an engine and a torque converter having a torque converter clutch. A command selecting between at least first and second modes of operation of the powertrain may be received. If the command indicates the first mode of operation, the first mode of operation of the powertrain may be initiated by enabling a torque governor for controlling a torque output of the engine based on an operator-requested torque and controlling the torque converter clutch to operate in accordance with a first clutch profile. If the command indicates the second mode of operation, the second mode of operation of the powertrain may be initiated by enabling a speed governor for controlling a rotational speed of the engine based on an operator-requested speed and controlling the torque converter clutch to operate in accordance with a second clutch profile that is different from the first clutch profile.

In another aspect, a system is provided for controlling the operation of powertrain. The powertrain may include an engine and a torque converter having a torque converter clutch. The system may include a torque governor for controlling a torque output of the engine based on an operator-requested torque. The system may also include a speed governor for controlling a rotational speed of the engine based on an operator-requested speed. A powertrain controller is operable to receive a command selecting between at least first and second modes of operation of the powertrain. If the command indicates the first mode of operation, the powertrain controller may initiate the first mode of operation of the powertrain by enabling the torque governor and controlling the torque converter clutch to operate in accordance with a first clutch profile. If the command indicates the second mode of operation, the powertrain controller may initiate the second mode of operation of the powertrain by enabling the speed governor and controlling the torque converter clutch to operate in accordance with a second clutch profile that is different from the first clutch profile.

In another aspect, a machine is provided. The machine may include a powertrain having at least an engine and a torque converter with a torque converter clutch. The machine may also include a torque governor for controlling a torque output of the engine based on an operator-requested torque. The machine may further include a speed governor for controlling a rotational speed of the engine based on an operator-requested speed. A powertrain controller is operable to receive a command selecting between at least first and second modes of operation of the powertrain. If the command indicates the first mode of operation, the powertrain controller may initiate the first mode of operation of the powertrain by enabling the torque governor and controlling the torque converter clutch to operate in accordance with a first clutch profile. If the command indicates the second mode of operation, the powertrain controller may initiate the second mode of operation of the powertrain by enabling the speed governor and controlling the torque converter clutch to operate in accordance with a second clutch profile that is different from the first clutch profile.

DETAILED DESCRIPTION

Figure 1:
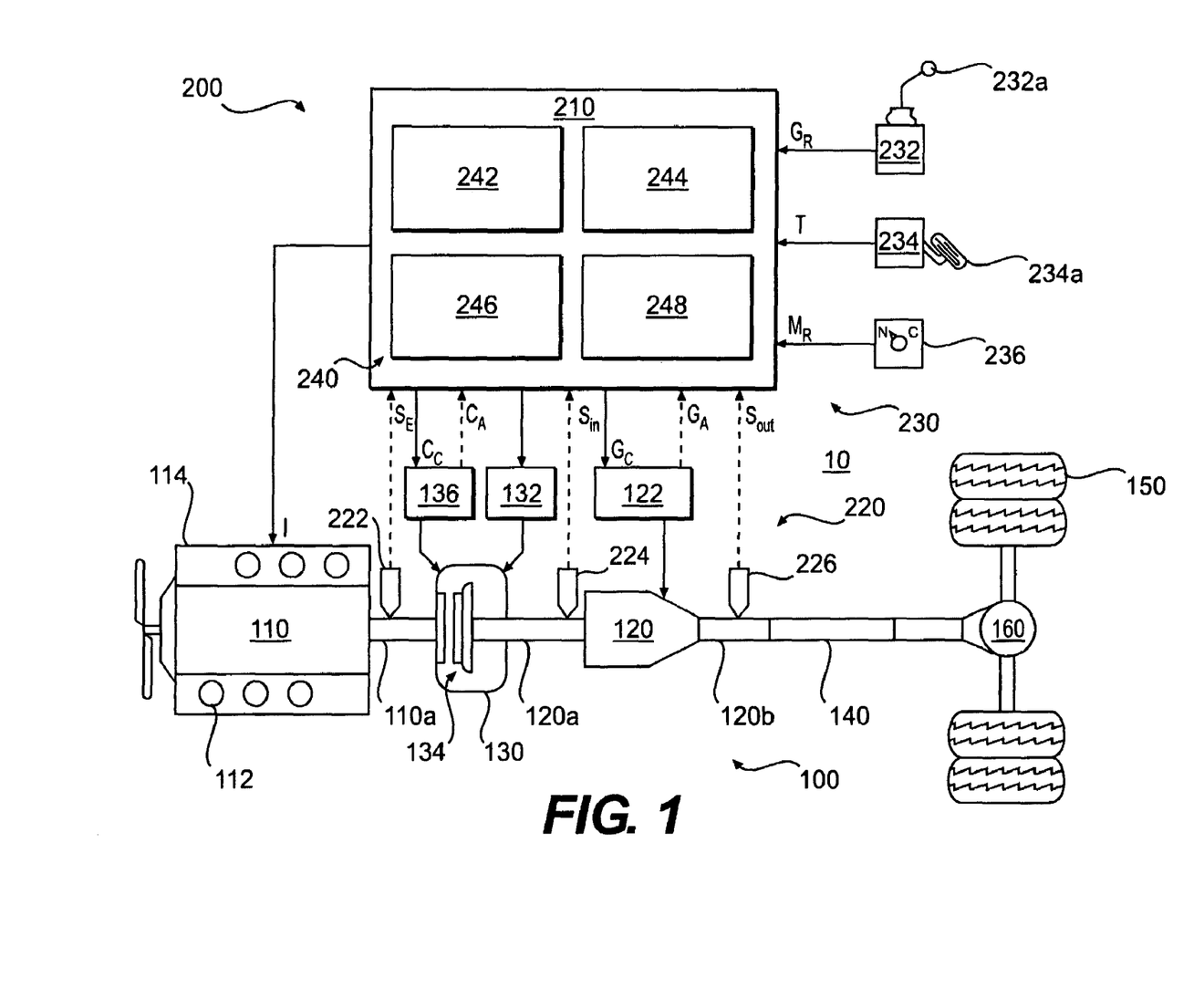
FIG. 1 schematically illustrates an exemplary machine having a powertrain and a powertrain control system, consistent with the present disclosure.

FIG. 1 schematically illustrates a machine 10 having a powertrain 100 and a powertrain control system 200, consistent with the present disclosure. Machine 10 may be any type of machine which is desired to be operated at low output speeds for an extended period. In an exemplary embodiment, machine 10 may be a self-propelled vocational vehicle, such as a cement truck, a dump truck, a farm tractor, etc. However, powertrain control system 200 is not limited to use in these types of machines, and other applications of powertrain control system 200 will be apparent to those of skill in the art.

Powertrain 100 may include an engine 110 and a transmission 120, operatively connected by a torque converter 130. In the illustrated embodiment, the output shaft (or crankshaft) 110a of transmission 120 is operatively connected to rotate a driveshaft 140, which in turn is connected to rotate wheels 150 via a differential 160.

Engine 110 may be any type of internal combustion engine. For example, engine 110 may be a compression-ignited or spark-ignited internal combustion engine having one or more cylinders 112. Engine 110 may include an ignition system 114, such as an electronic fuel injection system, having various actuators suitable for controlling the timing and delivery of fuel, air, and/or spark to cylinders 112 so as to drive pistons (not shown) within cylinders 112 and thus rotate crankshaft 110a at a desired rotational speed. Engine 110 may also be configured to drive various mechanically powered accessories (not shown) of machine 10. For example, crankshaft 110a may be coupled to drive one or more hydraulic pumps, water pumps, an alternator, etc., of machine 10.

Transmission 120 may be any type of automatic or partially-automated mechanical transmission. Transmission 120 may have a neutral position, one or more forward gears—including a lowest forward gear—and one or more reverse gears. Transmission 120 may be selectively actuated by a transmission shift actuator 122 to select an appropriate gear ratio and direction based on command inputs.

Torque converter 130 may operatively connect an input shaft 120a of transmission 120 to crankshaft 110a of engine 110. In an exemplary embodiment, torque converter 130 may be a hydrodynamic torque converter. Torque converter 130 may selectively couple crankshaft 110a to transmission input shaft 120a with a variable amount of slip, under the control of a torque converter actuator 132 (e.g., a hydraulic pump).

Torque converter 130 may also include a lock-up clutch 134, such as a frictional clutch or bypass clutch. Clutch 134 may be selectively actuated by a clutch actuator 136 (e.g., a hydraulic or pneumatic actuator or solenoid) for movement between a fully-engaged (lock-up) position and a fully-disengaged position. In the lock-up position, clutch 134 may selectively lock input shaft 120a of transmission 120 to turn with crankshaft 110a of engine 110 with a speed ratio of 1:1, i.e., with zero slip, so that the full amount of torque produced by engine 110 may be transferred to transmission 120. When engaged in this manner, lock-up clutch 134 may provide improved fuel-efficiency over torque converter 130 operating alone.

Powertrain control system 200 may include a powertrain controller 210, one or more machine sensors 220, and one or more command inputs 230. Powertrain controller 210 may be implemented using a processor (such as a microprocessor, not shown) and a computer-readable medium (such as RAM and/or ROM memory, not shown) for storing one or more control routines (e.g., software and/or firmware) adapted to configure the processor to perform one or more functions consistent with the present disclosure. However, powertrain controller 210 may alternatively be implemented by any other suitable technology, such as discrete electronic circuitry.

Machine sensors 220 may sense one or more operating and/or ambient conditions of machine 10, including powertrain 100, and output signals indicative of such conditions to powertrain controller 200. As shown in FIG. 1, machine sensors 220 may include an engine speed sensor 222, a transmission input speed sensor 224, and a transmission output speed sensor 226. However, in other embodiments of the present disclosure, one or more of speed sensors 222-226 may be omitted. Other machine sensors (not shown) may be provided to sense further operating parameters (e.g., oil pressure, cylinder position, air temperature, etc.) of machine 10.

Engine speed sensor 222 may be configured to transmit a signal $S_E$ indicative of the rotational speed of crankshaft 110a of engine 110 to powertrain controller 210. Transmission input speed sensor 224 and transmission output speed sensor 226 may be configured to transmit signals $S_{in}$ and $S_{out}$, indicative of the rotational speeds of transmission input shaft 120a and transmission output shaft 120b, respectively. It will be recognized that transmission output speed $S_{out}$ may be proportional to the ground speed of machine 10 by the ratio of differential 160 and the size of wheels 150.

Speed sensors 222-226 may be implemented using any suitable technology. For example, speed sensors 222-226 may be implemented using magnetic pick-ups configured to sense the passage of indicia, e.g., angularly spaced teeth (not shown) coupled to shafts 110a, 120a and/or 120b, respectively, and to transmit electrical signals indicative of the passage of the indicia, and thus of the rotational speed of the respective shafts.

Command inputs 230 may command certain operations of machine 10, including powertrain 100. In the illustrated embodiment, command inputs 230 may include a gear selector 232, a throttle input 234 and a mode selector 236. However, it is to be understood that other suitable command inputs 230, such as a steering input, a brake input, etc. (not shown), may be provided.

Gear selector 232 may be used to select a direction and maximum gear from among the various gears of transmission 120. Gear selector 232 may be configured to transmit a signal $G_R$ indicative of the operator's maximum requested gear to powertrain controller 210. For example, the gear request signal $G_R$ may be indicative of a shift position of a gear shift lever 232a or other suitable input adapted to be manipulated by an operator.

Throttle input 234 may be used by an operator to control the output torque and/or speed of engine 110, as discussed below. Throttle input 234 may be configured to transmit a throttle position signal T indicative of the displacement of a throttle, such as a pedal 234a or lever (not shown), manipulated by the operator. The magnitude of throttle position signal T may be proportional to the displacement of throttle input 234 between minimum and maximum positions. Alternatively, throttle input 234 may include, e.g., a map and/or formulae that define a linear or non-linear relationship between the position of throttle input 234 and the value of throttle position signal T.

Mode selector 236 may be used to request a particular mode of operation of powertrain control system 200. Consistent with the present disclosure, mode selector 236 may output a mode selection signal $M_R$ for requesting either a first (NORMAL) mode of operation or a second (CREEP) mode of operation. However, additional modes of powertrain operation may also be provided without departing from the scope of the present disclosure.

It is to be understood that the requested mode of operation (as indicated by signal $M_R$) may differ from the actual mode of operation of powertrain controller 210 commanded by powertrain controller 210. As discussed below, for example, powertrain controller 210 may decline to enter the requested mode of operation if one or more conditions for operation in the requested mode are not met. Mode selector 236 may be linked to one or more indicators, such as lights, a display, etc. (not shown), for communicating the requested mode of operation and/or the actual mode to the operator.

Mode selector 236 may be implemented using a toggle or other switch configured to be manipulated by the operator. For example, mode selector 236 may be implemented using a pushbutton switch having an ON position, in which, e.g., the CREEP mode is selected, and an OFF position, in which the NORMAL mode is selected. Alternatively, mode selector 236 may be implemented by providing a separate CREEP position for gear selector 232. In such an embodiment, placing gear shift lever 232*a* in the CREEP position may transmit both a signal requesting the lowest forward gear from transmission 120 and a signal requesting the CREEP mode of operation from powertrain controller 210.

In one embodiment, mode selector 236 may be automated. For instance, mode selector 236 may be implemented by a control routine of powertrain controller 210 that is configured to select the mode of operation based on information from machine sensors 220 and/or other command inputs 230.

Powertrain controller 210 may include one or more control functions 240 for controlling the operation of ignition system 114, transmission shift actuator 122, torque converter actuator 132 and/or clutch actuator 136, based upon commands received from command inputs 230 and/or information received from machine sensors 220. As shown in FIG. 1, control functions 240 may include a transmission shift controller 242, a torque converter/clutch controller 244, a torque governor 246, and a speed governor 248. Control functions 240 may be implemented by one or more control routines (e.g., software or firmware) of powertrain controller 210. Alternatively, control functions 240 may be implemented using another suitable technology, such as discrete electronic circuitry.

Transmission shift controller 242 may receive gear request signal $G_R$ from gear selector 232 and transmit a gear command signal $G_C$ to transmission shift actuator 122 based on the maximum gear ratio and direction requested by the operator, and the actual mode of operation. As vehicle speed increases in the NORMAL mode of operation, transmission shift controller 242 may control transmission shift actuator 122 to effect gear changes in accordance with a predetermined shifting strategy, until the maximum gear selected by the operator has been achieved. In the CREEP mode, transmission shift controller 242 may control transmission shift actuator 122 to prevent transmission 120 from shifting to positions other than the neutral position and the lowest forward gear. Transmission shift actuator 122 may provide a feedback signal $G_A$ indicative of the actual gear so that transmission shift controller 242 may provide closed-loop control of the transmission gear selection.

Torque converter/clutch controller 244 may control the operation of torque converter 130 and clutch 134 (via actuators 132 and 136, respectively) to achieve a desired amount of slip between crankshaft 110*a* and transmission input shaft 120*a*, based on the actual gear, engine speed and actual mode of operation. Consistent with the present disclosure, torque converter/clutch controller 244 may transmit a clutch command signal $C_C$ to clutch actuator 136 indicative of a desired position of lock-up clutch 134.

Torque converter/clutch controller 244 may include clutch control logic (e.g., a map and/or formulae) that commands a desired clutch position (or, alternatively, a desired clutch speed ratio $S_{in}/S_E$) for a given set of operating parameters. For example, the clutch control logic may define a desired clutch position (or speed ratio $S_{in}/S_E$) over a range of engine speeds for a given gear of transmission 120 and mode of operation. Clutch actuator 136 may provide a feedback signal $C_A$ indicative of the actual position of lock-up clutch 134 so that torque converter/clutch controller 244 may provide closed-loop control of the clutch position. Alternatively, torque converter/clutch controller 244 may provide closed-loop control of the clutch speed ratio $S_{in}/S_E$ via feedback from engine speed sensor 222 and transmission input speed sensor 224.

Figure 2:
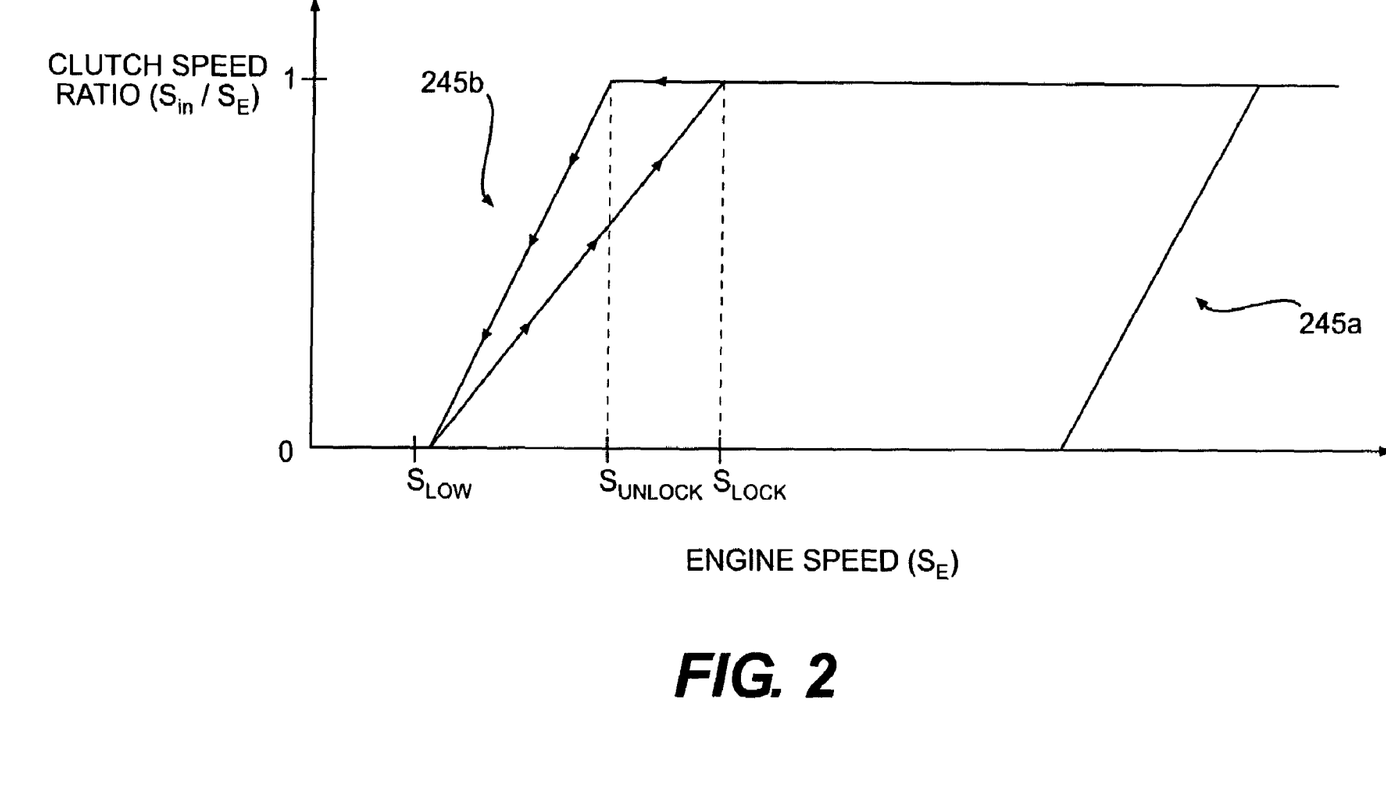
FIG. 2 is a graph that illustrates representative clutch control profiles, consistent with the present disclosure.

In an exemplary embodiment, the clutch control logic of torque converter/clutch controller 244 may include a first (NORMAL) clutch control profile 245*a* for use in the NORMAL mode of operation and a second (CREEP) profile 245*b* for use in the CREEP mode of operation. FIG. 2 is a graph that illustrates a representative NORMAL clutch control profile 245*a* and a representative CREEP profile 245*b*.

As shown in FIG. 2, clutch control profiles 245*a* and *b* may define a desired clutch speed ratio $S_{in}/S_E$ (y-axis) for a given engine speed $S_E$ (x-axis). Profiles 245*a* and *b* may be implemented using, e.g., a map and/or formulae that define a relationship between the desired clutch position (or speed ratio $S_{in}/S_E$) over the operating range of engine speeds $S_E$ in the given gear. It should be understood that clutch control profiles 245*a* and *b* shown in FIG. 2 are intended to illustrate the differences between CREEP profile 245*b* and NORMAL profile 245*a*, and that the contours of profiles 245*a* and *b* may be varied in accordance with principles known to those skilled in the art. For example, the NORMAL clutch control profile 245*a* and CREEP profile 245*b* for a particular powertrain configuration may be optimized through empirical testing and/or modeling using, e.g., computer simulation techniques.

Consistent with the present disclosure, CREEP profile 245*b* may be provided for the lowest forward gear of transmission 120. As shown in FIG. 2, in the lowest forward gear, CREEP profile 245*b* may control lock-up clutch 134 to provide a "start-up" or "launch" mode, such that clutch 134 may be used to launch machine 10 from a stopped position ($S_{out}=0$).

In the launch mode, CREEP profile 245*b* may control clutch 134 to begin to engage at an engine speed $S_E$ at or near a low idle engine speed $S_{low}$. As engine speed increases (positive x-direction), CREEP profile 245*b* may control clutch 134 to gradually reduce clutch slip (i.e., the difference between the speed $S_{in}$ of transmission input shaft 120*a* and the speed $S_E$ of crankshaft 110*a*) until the transmission input speed $S_{in}$ approaches the engine speed $S_E$. When the transmission input speed $S_{in}$ becomes sufficiently close to the engine speed $S_E$, CREEP profile 245*b* may control clutch actuator 136 to place clutch 134 in the lock-up position, such that the transmission input shaft speed $S_{in}$ equals the engine speed $S_E$ (i.e., no slip, $S_{in}/S_E=1$). For example, CREEP profile 245*b* may control clutch 134 to achieve lock-up at an engine speed, $S_{lock}$, that is between about 100 rpm and about 200 rpm higher than the low idle engine speed $S_{low}$ for the particular engine 110.

Once clutch 134 has achieved lock-up, CREEP profile 245*b* may control clutch 134 to remain in lock-up even if the speed of engine 110 drops slightly below $S_{lock}$. For example, as engine speed decreases (negative x-direction) CREEP profile 245*b* may control clutch 134 to remain in lock-up until the engine speed drops to a speed $S_{unlock}$, which may be lower than $S_{lock}$, but at least slightly above a speed at which engine 110 may stall with clutch 134 in lock-up. Thus, CREEP profile 245b may provide a hysteresis (see FIG. 2) between the speed $S_{lock}$ at which lock-up is initiated and the speed $S_{unlock}$ at which lock-up is thereafter terminated. In this manner, CREEP profile 245b may prevent oscillation of clutch 134 in and out of the lock-up position, which could increase wear on clutch 134.

In contrast to CREEP profile 245b, NORMAL clutch control profile 245a may not provide a launch mode for clutch 134. For example, NORMAL clutch profile 245a may control clutch 134 so that clutch 134 does not engage in the lowest forward gear, or (as illustrated in FIG. 2) so that clutch 134 does not begin to engage until the engine speed $S_E$ is much higher than the low idle engine speed $S_{low}$. Thus, the launch mode of clutch 134 may be unavailable in the NORMAL mode of operation.

Instead, in the NORMAL mode of operation, powertrain controller 200 may launch machine 10 using torque converter 130 alone to modulate the transfer of power from engine 110 to transmission 120. For example, NORMAL profile 245a may control torque converter 130 to gradually reduce slip so as to smoothly launch vehicle 10 from a stopped position.

Thus, consistent with the present disclosure, CREEP profile 245b may command clutch 134 to begin to engage and/or to achieve lock-up at lower engine speeds and/or in lower transmission gears than NORMAL clutch control profile 245a. By providing a CREEP mode of operation in which clutch 134 begins to engage at a relatively low transmission output speed (with respect to the NORMAL mode), and in which clutch 134 (rather than torque converter 130) may be used to launch machine 10, systems and methods consistent with the present disclosure may reduce heat damage to torque converter 130 during prolonged operation at low vehicle speeds. By commanding clutch 134 to achieve lock-up at a relatively low engine speed, systems and methods consistent with the present disclosure may also provide increased fuel efficiency during operation at low vehicle speeds.

Powertrain controller 210 may enable torque governor 246 in the NORMAL mode of operation. When enabled, torque governor 246 may responsively regulate the torque produced by engine 110 to achieve a requested change in the output torque of engine. Torque governor 246 may determine the requested torque change based on throttle position signal T. For example, torque governor 246 may interpret the degree of displacement of the throttle (as indicated by throttle position signal 7) as indicative of the operator's desired change in torque output. In one embodiment, the magnitude of the torque change may be proportional to the displacement of throttle input 234 between minimum and maximum positions. Alternatively, torque governor 246 may include, e.g., a map and/or formulae that define a linear or non-linear relationship between the value of the throttle position signal T and the magnitude of the requested change in output torque.

Torque governor 246 may calculate the current output torque of engine 110 and transmit one or more signals I for controlling ignition system 114 to achieve the requested change in output torque, within a certain margin of error. In one embodiment, torque governor 246 may be implemented using a proportional-integral-derivative (PID) control strategy. Alternatively, torque governor 246 may be implemented using any other suitable control strategy, such as a proportional-integral (PI) control strategy.

Torque governor 246 may limit the requested change in output torque in order to maintain the torque output of engine 110 between specified minimum and maximum torque limits. For example as the load on the engine 110 increases (e.g., as machine 10 climbs a hill) torque governor 246 may allow engine speed $S_E$ to decrease in order to avoid exceeding the maximum torque limit. The maximum torque limit may be chosen to prevent damage to powertrain 100 and/or ancillary driven devices, such as pumps, etc. The minimum torque limit may be selected to prevent engine 110 from stalling. Torque governor 246 may calculate the minimum and maximum torque limits based on the current operating conditions of machine 10, as indicated by the output of machine sensors 220.

Powertrain controller 210 may enable speed governor 248 in the CREEP mode of operation. When enabled, speed governor 248 may responsively regulate the speed $S_E$ of engine 110 so as to achieve a requested vehicle speed in the lowest forward gear of transmission. In one embodiment, speed governor 248 may interpret the degree of displacement of throttle input 234 as indicative of the operator's requested speed. For instance, the displacement of throttle input 234 between minimum and maximum positions may be correlated with the full range of vehicle speeds achievable in the lowest forward gear. Alternatively, speed governor 248 may include, e.g., a map and/or formulae that define a linear or non-linear relationship between the value of the throttle position signal T and the magnitude of the requested speed. In another embodiment, the operator may set a requested speed using a cruise control input (not shown).

Speed governor 248 may determine the difference (if any) between the current transmission output speed $S_{out}$ and the transmission output speed corresponding to the requested vehicle speed, and transmit one or more signals I for controlling ignition system 114 to achieve the requested vehicle speed within a certain margin of error. For example, as the load on the engine 110 increases (e.g., as machine 10 climbs a hill) speed governor 248 may increase the rate of fuel combustion of engine 110 in order to maintain the operator's requested speed. Conversely, as the load on engine 110 decreases (e.g., as machine 10 descends a hill) speed governor 248 may decrease the rate of fuel combustion engine 110 in order to avoid exceeding the requested speed. Speed governor 248 may be implemented using any suitable control strategy, such as a PID or PI control strategy.

Figure 3:
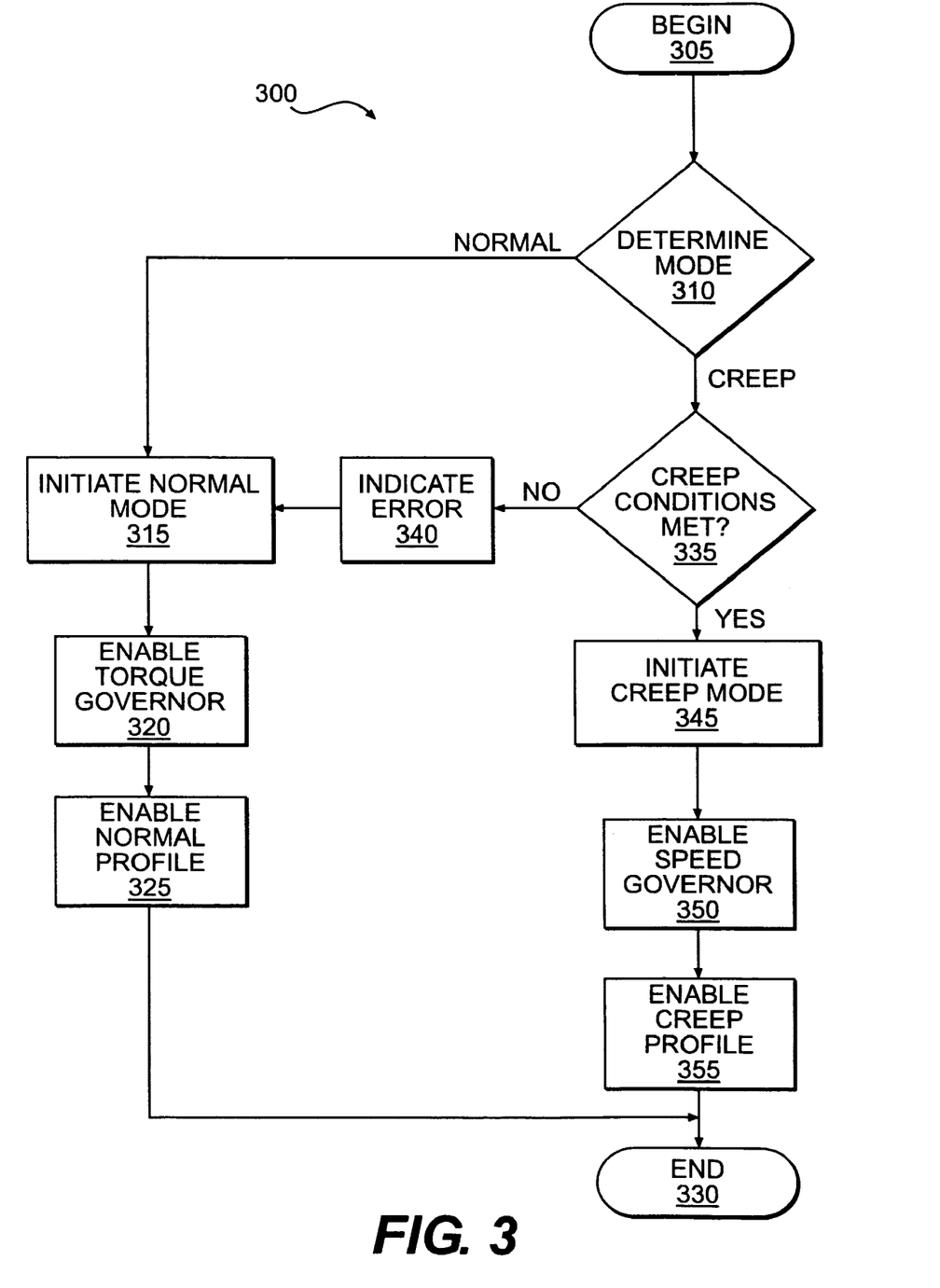
FIG. 3 is a flow diagram of an exemplary method for controlling a powertrain, consistent with the present disclosure.

Powertrain controller 110 may enable one of torque governor 246 and speed governor 248, based on the selected mode of operation. FIG. 3 is a flow diagram of an exemplary method 300 for controlling the operation of powertrain 100. Powertrain controller 210 may include one or more control routines (e.g., software) for configuring powertrain controller 210 to perform method 300. While exemplary method 300 is described as a series of acts, the order of the acts may vary in other implementations consistent with the present disclosure. In particular, non-dependent acts may be performed in any order, or in parallel.

Method 300 may begin (block 305) at any time powertrain controller 210 is initiated, e.g., at engine start-up, or at any time controller 210 senses a change in the requested mode of operation, as indicated by mode selector 236. For example, powertrain controller may monitor mode request signal $M_R$ and initiate method 300 upon detecting a change in the state of mode selection signal $M_R$, e.g., from NORMAL to CREEP, or vice versa. At block 310, powertrain controller 210 may determine the requested mode of operation (e.g., NORMAL or CREEP) indicated by mode selection signal $M_R$.

If the NORMAL mode has been requested (block 310: NORMAL), then powertrain controller 210 may initiate the NORMAL mode of operation (block 315). In the NORMAL mode, powertrain controller 210 may enable torque governor 246 (block 320) and inhibit speed governor 248. As discussed above, torque governor 246 may interpret throttle position signal T as indicative of the operator's desired change in torque output, and responsively regulate ignition system 114 so as to achieve the operator's desired change in torque, within a certain margin of error. Further in the NORMAL mode, transmission shift controller 242 may control transmission shift actuator 122 to effect gear changes over the full range of gears of transmission 120.

Also in the NORMAL mode of operation, torque converter/clutch controller 244 may load or enable first (NORMAL) clutch control profile 245a (block 325). In accordance with NORMAL profile 245a, powertrain controller 200 may launch machine 10 using torque converter 130 alone to modulate the transfer of power from engine 110 to transmission 120.

Powertrain controller 210 may continue to control powertrain 100 in the NORMAL mode of operation until a different mode of operation is selected (return to block 310), or method 300 is ended (block 330). Method 300 may be ended, for instance, where powertrain controller 210 is turned off, e.g., at engine stop.

Returning to block 310, if the CREEP mode has been requested (block 310: CREEP), then powertrain controller 210 may determine whether the current operating conditions of powertrain 100 allow it to safely enter the CREEP mode (block 335). Because the CREEP mode of operation is applicable at lower engine speeds than the NORMAL mode, a given position of throttle input 234 may command a lower engine speed $S_E$ in the CREEP mode of operation than in the NORMAL mode. In order to avoid damaging powertrain 100 or surprising the operator with a sudden drop in engine speed (for instance, if the operator were to hold the throttle at a constant position when changing from the NORMAL mode of operation to the CREEP mode), powertrain controller 210 may allow the operator to initiate the CREEP mode only if one or more conditions are satisfied.

In one embodiment, powertrain controller 210 may require that gear selector 232 be in the neutral position (or, alternatively, in the CREEP position or lowest forward gear position), in order for a request to enter the CREEP mode to be granted. For example, powertrain controller 210 may determine whether gear request signal $G_R$ indicates that gear shift lever 232a is in the neutral position.

In another embodiment, powertrain controller 210 may require that transmission 120 be in the neutral position in order to enter the CREEP mode. For example, powertrain controller 210 may determine whether actual gear signal $G_A$ indicates that transmission 120 is in the neutral position. Alternatively, powertrain controller 210 may require that transmission 120 be in one of the neutral position and the lowest forward gear position (e.g., as indicated by actual gear signal $G_A$) in order to enter (or remain in) the CREEP mode.

In a further embodiment, powertrain controller 210 may require that the transmission output speed $S_{out}$ be less than a predetermined value in order to enter the CREEP mode. For example, powertrain controller 210 may require that the transmission output speed $S_{out}$ be at or near zero, e.g., so that machine 10 is in a stopped position, in order to initiate the CREEP mode of operation.

By requiring that one or more of these conditions be satisfied before entry into the CREEP mode of operation, powertrain controller 210 may prevent sudden changes in engine speed upon initialization of speed governor 248 in the CREEP mode. It is to be understood that powertrain controller 210 may require some or all of the above-mentioned criteria be satisfied before initiating the CREEP mode. However, the listed criteria are not exhaustive, and other suitable criteria for ensuring safe transition between the NORMAL and CREEP modes will be apparent to those of skill in the art.

If one or more of the conditions for entry into the CREEP mode are not satisfied (block 335: NO), then powertrain controller 210 may indicate an error to the operator (block 340), e.g., via a display (not shown) or audible warning. Further, powertrain controller 210 may decline to initiate the CREEP mode of operation, and instead initiate the NORMAL mode of operation (block 315). That is, the NORMAL mode may be implemented as a default mode in the event that a request to enter the CREEP is not successful. If all of the conditions required by powertrain controller 210 are satisfied (335: YES), then powertrain controller 210 may initiate the CREEP mode of operation (block 345).

In the CREEP mode, powertrain controller 210 may enable speed governor 248 (block 350) and inhibit torque governor 246. As discussed above, speed governor 248 may responsively regulate ignition system 114 to achieve the operator's desired vehicle speed (e.g., as indicated by throttle input 234) within a certain margin of error.

Also in the CREEP mode, transmission shift controller 242 may control transmission shift actuator 122 to prevent transmission 120 from shifting to positions other than the neutral position and the lowest forward gear. Alternatively, powertrain controller may monitor gear selection signal $G_R$, and automatically switch to the NORMAL mode of operation (block 315) if a position other than the neutral position or the lowest forward gear is selected.

Further in the CREEP mode of operation, torque converter/clutch controller 244 may load or enable second (CREEP) clutch control profile 245b (block 355). As discussed above, CREEP profile may provide a launch mode, wherein clutch 134 may be used to launch machine 10 from a stopped position. Further, CREEP profile 245b may command clutch 134 to begin to engage and/or to achieve lock-up at lower engine speeds and/or in lower transmission gears than NORMAL clutch control profile 245a.

Powertrain controller 210 may continue to control powertrain 100 in the CREEP mode of operation until a different mode of operation is selected (block 310), or powertrain controller 210 is turned off (block 330), e.g., at engine stop.

INDUSTRIAL APPLICABILITY

The presently disclosed systems and methods for powertrain control may be applied to any type of powertrain having an internal combustion engine. In a self-propelled machine, systems and methods consistent with the present disclosure may enhance low speed maneuverability. By providing for the control of vehicle speed in multiple modes of operation using a single throttle input, embodiments of the present disclosure may reduce operator fatigue and allow operators to attend to other important tasks. By providing a CREEP mode of operation in which the clutch achieves lock-up at a relatively low engine speed (with respect to a NORMAL mode of operation) and in which the clutch, rather than the torque converter, may be used to launch the vehicle, systems and methods consistent with the present disclosure may provide enhanced low speed operations with greater fuel efficiency and less wear on vehicle components.

Other embodiments of the present disclosure will be apparent to those skilled in the art from consideration of the specification and practice of the disclosure disclosed herein.

It is intended that the specification and examples be considered as exemplary only, with a true scope of the disclosure being indicated by the following claims.

What is claimed is:

1. A method for controlling the operation of powertrain, the powertrain including at least an engine and a torque converter having a torque converter clutch, the method comprising:
receiving a command selecting between at least a first mode and a second mode of operation of the powertrain; and
if the command indicates the first mode of operation, initiating the first mode of operation of the powertrain by:
enabling a torque governor for controlling a torque output of the engine based on an operator-requested torque; and
controlling the torque converter clutch to operate in accordance with a first clutch profile;
if the command indicates the second mode of operation, initiating a second mode of operation of the powertrain by:
enabling a speed governor for controlling a rotational speed of the engine based on an operator-requested speed; and
controlling the torque converter clutch to operate in accordance with a second clutch profile.

2. The method of claim 1, wherein the second clutch profile is different from the first clutch profile in that the second clutch profile includes a launch mode for controlling the clutch to launch the powertrain.

3. The method of claim 1, wherein the torque converter clutch comprises a lock-up clutch, and second clutch profile controls the clutch to become fully engaged at an engine speed that is lower than an engine speed at which the clutch may become fully engaged under the control of the first clutch profile.

4. The method of claim 1, wherein the powertrain includes a throttle input for commanding an output of the powertrain, and wherein:
in the first mode of operation, the torque governor interprets the throttle input as commanding a torque change; and
in the second mode of operation, the speed governor interprets the throttle input as commanding a vehicle speed.

5. The method of claim 1, further comprising, if the command indicates the second mode of operation:
measuring at least one operating parameter of the powertrain;
determining whether the measured parameter satisfies a condition;
initiating the second mode of operation, if the condition is satisfied; and
initiating the first mode of operation, if the condition is not satisfied.

6. The method of claim 5, wherein determining whether the measured parameter satisfies a condition includes determining that at least one of (a) a gear selector or (b) a transmission of the powertrain is in a neutral position.

7. The method of claim 5, wherein the powertrain is the powertrain of a vehicle, and determining whether the measured parameter satisfies a condition includes determining whether the vehicle is stopped.

8. The method of claim 1, wherein:
enabling the torque governor includes inhibiting the speed governor; and
enabling the speed governor includes inhibiting the torque governor.

9. A system for controlling the operation of powertrain, the powertrain including at least an engine and a torque converter having a torque converter clutch, the system comprising:
a torque governor for controlling a torque output of the engine based on an operator-requested torque;
a speed governor for controlling a rotational speed of the engine based on an operator-requested speed; and
a powertrain controller operable to:
receive a command selecting between at least a first mode and a second mode of operation of the powertrain; and
if the command indicates the first mode of operation, initiate a first mode of operation of the powertrain by:
enabling the torque governor; and
controlling the torque converter clutch to operate in accordance with a first clutch profile; and
if the command indicates the second mode of operation, initiate a second mode of operation of the powertrain by:
enabling the speed governor; and
controlling the torque converter clutch to operate in accordance with a second clutch profile.

10. The system of claim 9, wherein the second clutch profile is different from the first clutch profile in that the second clutch profile includes a launch mode for controlling the clutch to launch the powertrain.

11. The system of claim 9, wherein the torque converter clutch comprises a lock-up clutch, and second clutch profile controls the clutch to become fully engaged at an engine speed that is lower than an engine speed at which the clutch may become fully engaged under the control of the first clutch profile.

12. The system of claim 9, wherein the powertrain includes a throttle input for commanding an output of the powertrain, and wherein:
in the first mode of operation, the torque governor interprets the throttle input as commanding a torque change; and
in the second mode of operation, the speed governor interprets the throttle input as commanding a vehicle speed.

13. The system of claim 9, wherein, if the command indicates the second mode of operation, the powertrain controller:
measures at least one operating parameter of the powertrain; and
determines whether the measured parameter satisfies a condition;
initiates the second mode of operation, if the condition is satisfied; and
initiates the first mode of operation, if the condition is not satisfied.

14. The system of claim 13, wherein, prior to initiating the second mode of operation, the powertrain controller requires that at least one of (a) a gear selector or (b) a transmission of the powertrain be in a neutral position.

15. The system of claim 13, wherein the powertrain is the powertrain of a vehicle, and wherein, prior to initiating the second mode of operation, the powertrain controller requires that the vehicle be stopped.

16. The system of claim 9, wherein:
upon enabling the torque governor, the powertrain controller inhibits the speed governor; and upon enabling the speed governor, the powertrain controller inhibits the torque governor.

17. A machine comprising:
a powertrain including at least an engine and a torque converter having a torque converter clutch;
a torque governor for controlling a torque output of the engine based on an operator-requested torque;
a speed governor for controlling a rotational speed of the engine based on an operator-requested speed; and
a powertrain controller operable to:
receive a command selecting between at least a first mode and a second mode of operation of the powertrain; and
if the command indicates the first mode of operation, initiate a first mode of operation of the powertrain by:
enabling the torque governor; and
controlling the torque converter clutch to operate in accordance with a first clutch profile; and
if the command indicates the second mode of operation, initiate a second mode of operation of the powertrain by:
enabling the speed governor; and
controlling the torque converter clutch to operate in accordance with a second clutch profile.

18. The machine of claim 17, wherein the second clutch profile is different from the first clutch profile in that the second clutch profile includes a launch mode for controlling the clutch to launch the machine.

19. The machine of claim 17, wherein the torque converter clutch comprises a lock-up clutch, and second clutch profile controls the clutch to become fully engaged at an engine speed that is lower than an engine speed at which the clutch may become fully engaged under the control of the first clutch profile.

20. The machine of claim 17, wherein the powertrain includes a throttle input for commanding an output of the powertrain, and wherein:
in the first mode of operation, the torque governor interprets the throttle input as commanding a torque change; and
in the second mode of operation, the speed governor interprets the throttle input as commanding a vehicle speed.

21. The machine of claim 17, wherein, if the command indicates the second mode of operation, the powertrain controller:
measures at least one operating parameter of the powertrain; and
determines whether the measured parameter satisfies a condition;
initiates the second mode of operation, if the condition is satisfied; and
initiates the first mode of operation, if the condition is not satisfied.

22. The machine of claim 21, wherein, prior to initiating the second mode of operation, the powertrain controller requires that at least one of (a) a gear selector or (b) a transmission of the powertrain be in a neutral position.

23. The machine of claim 21, wherein the machine is a vehicle, and wherein, prior to initiating the second mode of operation, the powertrain controller requires that the vehicle be stopped.

24. The machine of claim 17, wherein:
upon enabling the torque governor, the powertrain controller inhibits the speed governor; and
upon enabling the speed governor, the powertrain controller inhibits the torque governor.

* * * * *